Patented Sept. 5, 1933

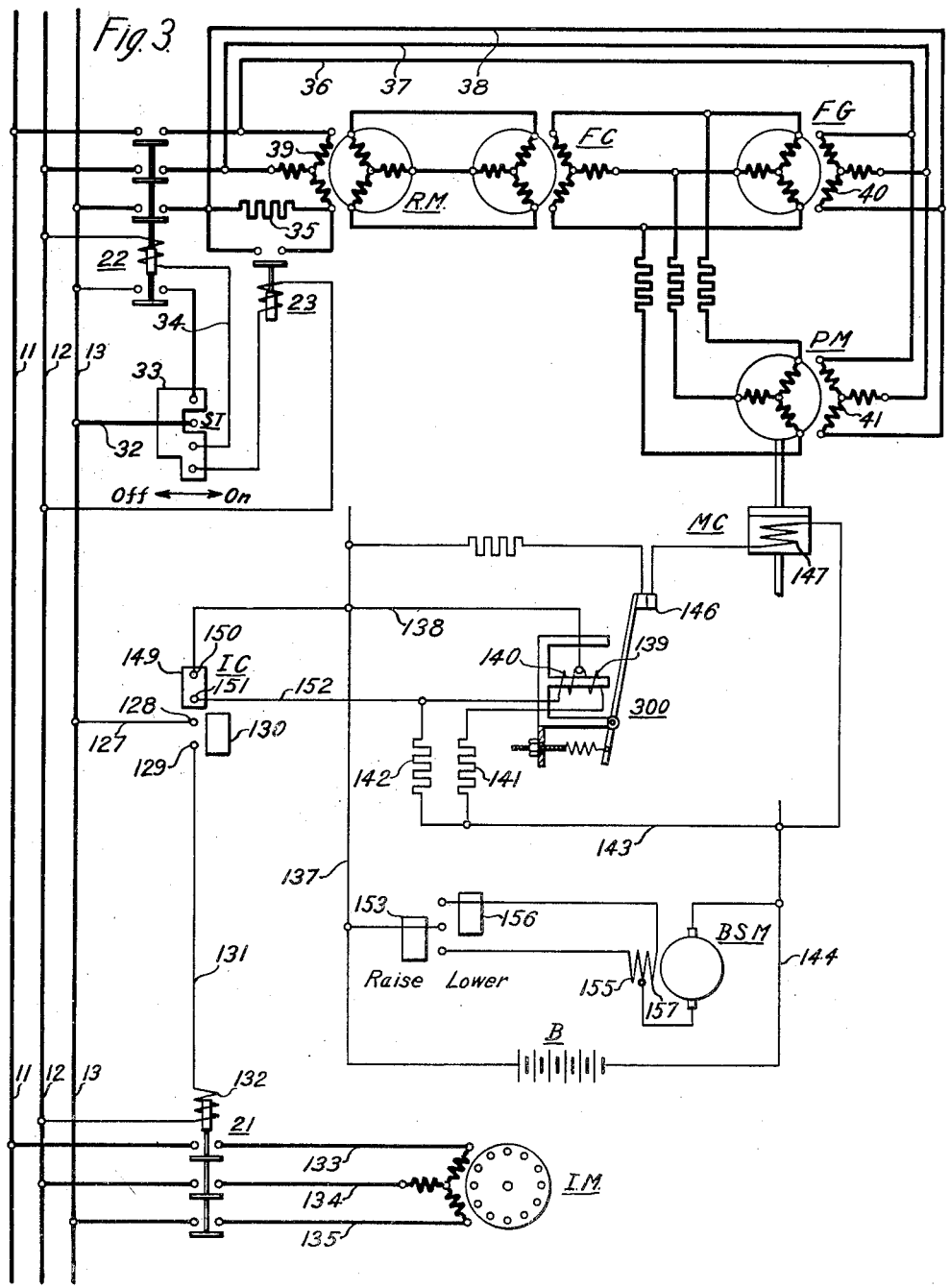

1,925,866

UNITED STATES PATENT OFFICE 1,925,866

SYNCHRONIZED MOTOR DRIVE FOR SUPER-CALENDERS AND WINDERS

Chester W. Drake, Irwin, Pa., assignor to Westinghouse Electric & Manufacturing Company, a corporation of Pennsylvania Application November 11, 1931
Serial No. 574,275

20 Claims. (Cl. 92—73)

This invention relates to a system of control for governing the operating characteristics of a plurality of motors.

More particularly this invention relates to an electric control system for governing the operation of the motors utilized in a paper machine for driving the super-calender, the supply reel and the winder reel.

With some of the devices heretofore in use, an attempt has been made to maintain a constant speed difference between the super-calender and winder reel during normal operation, that is, during full constant speed operation. No provision is thus made for maintaining a constant speed ratio or percentage of speed difference between the winder-reel motor and the calender motor for any speeds, or changing speeds, of the calender motor. With the devices heretofore presented to the trade, the paper either moves to the winder reel with insufficient tension thereby providing a loosely wound roll or else the paper, rubber, or other material being operated upon is stretched or ruptured.

It is an object of this invention to maintain a constant tension in material, such as paper, rubber, textile fabric, cloth, etc., in passing from one point in a machine to another point regardless of changes in the speed of the machine.

Another object of this invention is to selectively control the tension of the paper or other material in a winding machine.

A further object of this invention is to maintain any selected tension in material, such as paper, rubber, textile fabric, etc., in passing through a machine performing an operation thereon.

A more specific object of this invention is the provision of an electrical control system whereby any predetermined proportional difference in speed between two motors may be automatically maintained for all speeds of the motors.

It is also an object of this invention to provide a super-calender and winder drive and control system therefor that shall be simple in construction and efficient in operation.

Other objects of this invention will be apparent, to those skilled in the art, from the following description taken in conjunction with the accompanying drawings, in which:

Fig. 3 is a diagrammatic showing of the winder reel motor and the related equipment for controlling the relative speed of calender motor and winder reel motor.

Figure 1:
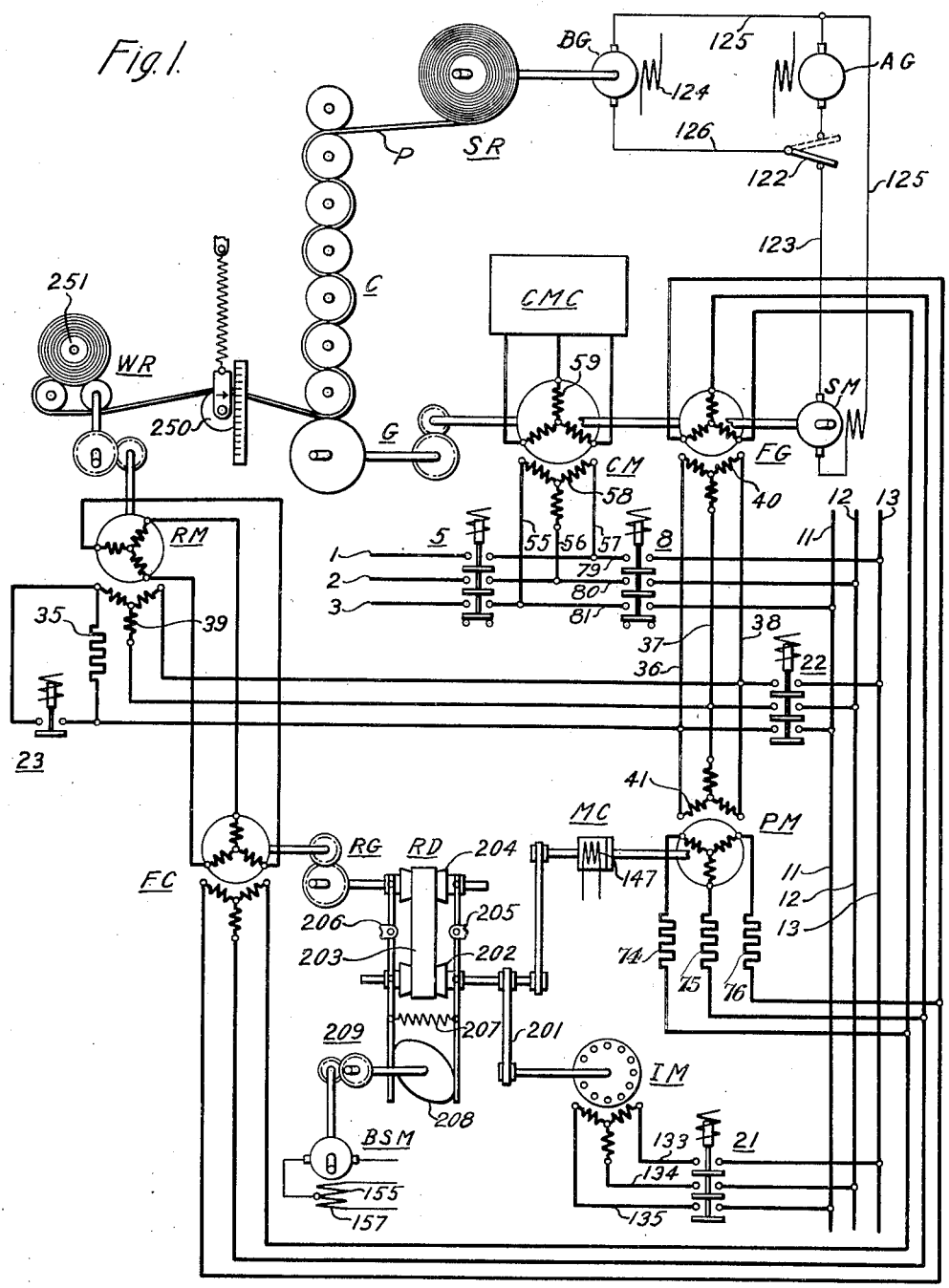
Figure 1 is a diagrammatic showing of the dual-frequency constant-tension calender and winder drive, showing some of the control equipment.

Referring to Fig. 1 showing the various elements of this invention in operative relation, supply reel SR supplies paper P to the calender C from whence the paper passes over the idler roller 250 to the winder WR at which winder the paper is wound upon core 251. Associated with the calender C is a calender motor CM driving the calender through a reduction gear G. A frequency generator FG and a series motor SM are mechanically coupled to the calender motor CM and therefore operated at the same speed as the calender motor. If a reduction gear of some kind be interposed between the calender motor and the frequency generator and the motor SM, it is, of course, obvious that the speed of these machines, while not the same, would have some definite relation to that of the calender motor CM.

The braking generator BG is a shunt generator having field windings 124 and is disposed to supply energy to the shaft of the calender motor CM by the circuit through the armature of braking generator BG, conductor 126, double throw switch 122, and conductor 123 to the series motor SM, and conductor 125 to the generator BG. The operation of the braking generator BG is to produce a certain braking action on the supply reel so that the paper P is supplied to the calender motor at some substantially predetermined tension.

During the threading operation, while threading the paper P through the calender and the winder, the switch 122 is thrown to the position shown by the dotted lines, thereby disconnecting the series motor SM from the braking generator BG and connecting the auxiliary generator AG to the braking generator BG thereby driving the generator as a motor in such direction that the paper P is fed to the calender C and the attendant merely has to guide the paper to the required rolls to thread the same through the calender, and he is not burdened with the duty of turning the supply reel by hand, and, at the same time, threading the paper through the rolls of the calender. The assembly of the braking generator BG and the auxiliary generator AG as used in connection with the motor SM, per se, constitutes no part of this invention. However, these units are shown in combination with this invention to more clearly bring out the complete novel results obtained by this invention.

The auxiliary generator AG or booster generator may be connected in series conductors 126 and 123. Such connection eliminates the switch 122 and simplifies the control and operating characteristics very materially since by such series connection all the desired operations can be accomplished by shifting the field rheostat connection to excite the field from a given positive value through zero to a given negative value.

For the threading operation it is obvious that the speed of the calender and winder must be much lower than during normal operation and in consequence two sources of alternating current are available for the calender motor CM. The conductors 1, 2 and 3 lead to a source of supply having a very low frequency such as three cycles per second whereas the conductors 11, 12 and 13 lead to a source of supply having a higher frequency such, for example, as sixty cycles per second. With the calenders and winders heretofore used, it was discovered sometime ago that for different operating speeds of the winder and calender synchronism could not be maintained and a satisfactory roll of paper on the core 251 could not be produced. In consequence, various control systems were devised whereby the core 251 was rotated at a slightly higher speed than the rolls of the calender C. It was found that so long as the calender speed remains substantially constant a reasonably satisfactory roll could be obtained on the core 251. However, if the speed regulation of the calender motor was poor, and particularly during the accelerating periods of the calender motor, no proper winding of the paper on the core 251 could be accomplished.

In this invention a control system is provided whereby a constant tension is maintained in the paper regardless of the changes in the speed of the calender motor. To accomplish this, the reel motor RM of the winder WR is interconnected with a frequency changer FC which, in turn, is interconnected with the frequency generator FG and a pilot motor PM. The frequency generator FG and the pilot motor PM, through resistors 74, 75 and 76, are disposed to be energized by an alternating current of substantially constant frequency and by the alternating current supplied by the frequency generator. If desired this pilot motor may be driven by a separate frequency generator instead of being connected in parallel as specified. For the circuit arrangements just pointed out it is obvious that the pilot motor will run in synchronism with the frequency generator, substantially as if they were mechanically coupled, and the reel motor RM may be made to run at a slightly higher speed than the calender motor if the frequency changer with which it is connected is rotated at some slow speed having a definite relation to the speed of the pilot motor. To accomplish this result, a variable speed drive RD is interposed between the pilot motor PM and the frequency changer FC. By a suitable selection of the belt position of the drive the frequency changer may be rotated at any selected slow speed and in the desired direction, thereby supplying the reel motor with an alternating current having a frequency slightly higher, or, if desired, lower than the frequency supplied by the frequency generator FG. Since the frequency of the frequency generator FG is a direct function of the speed of the calender motor CM it is obvious that the reel motor RM will always operate at a speed having a definite relation to the speed of the calender motor CM, that is, the speed ratio between the calender motor CM and the reel motor RM would remain substantially constant for all speeds of the calender motor CM.

The particular speed ratio that will obtain between the reel motor RM and the calendar motor CM will depend upon the position of the belt 203 of the variable speed drive RD, and the position of the belt will be determined by the operation of the belt-shifting motor BSM operating on the drive RD through the reduction gear 209, cam 208, and the levers pivoted at 205 and 206 and pivotally engaging the cones 202 and 204. The spring 207 biases the levers in firm contact with the cam 208, and the opposite cones 204 and the opposite cones 202 are shifted relative to each other thereby changing the speed ratio between the pilot motor PM and the frequency changer FC.

For a more complete understanding of the operation and the novel results obtained by this invention, a sequence of operation beginning from standstill of all equipment to full normal running speed will now be discussed.

Figure 2:
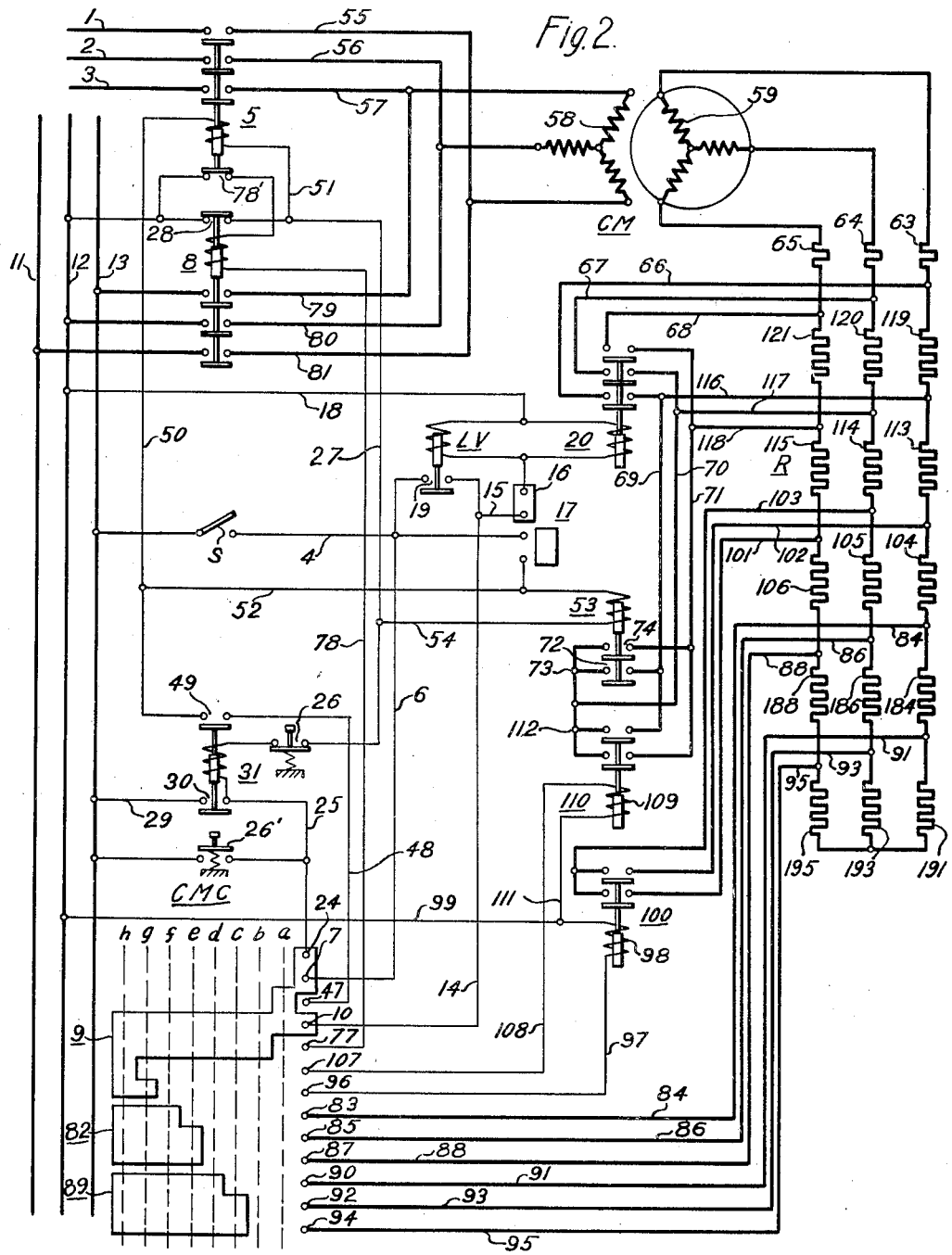
Fig. 2 is a diagrammatic showing of the calender motor and control therefor.

Assume that the paper P has not been threaded through the calender nor any portion thereof wound on the core 251 and that the various control switches and the calender motor controller, schematically shown in Fig. 1 but more specifically shown in Fig. 2, are in the positions shown in Fig. 2 and that all of the other control switches are in the positions shown in the respective figures. To make it possible to take care of the initial stages of threading, i. e., the operation of motor, RM, at a slow speed, the controller ST (Fig. 3) is moved to the "on" position thereby a circuit is established from the conductor 13 through conductor 32, controller segment 33, conductor 34, and the actuating coil of the contactor 22 to the conductor 12. Operation of the contactor 22 connects the stator winding 39 of the reel motor RM through resistor 35 to the high frequency source of supply 11, 12 and 13. Since conductors 36, 37 and 38 are thereby energized, the stators 40 and 41 of the frequency generator FG and the pilot motor PM, respectively, are also energized from conductors 11, 12 and 13, but none of these machines operate, however, because the frequency generator is mechanically coupled to the calender motor which at this stage is not yet energized. The reel motor thus operates at slow speed to permit the proper threading of the material. It should also be noted that the operation of the contactor 22 establishes a holding circuit through the lower members of this contactor and in consequence the controller ST may, thereafter at any time desired, be moved to the position shown in Fig. 3 without effecting the opening of the contactor 22. Movement of the controller ST to the position shown causes the energization of the controller relay 23 through the conductor 32 and the controller segment 33, thereby effecting the shunting of the slow speed rheostat 35.

To start the calender motor, the knife switch S is closed, thereby establishing a circuit from the conductor 13 through the switch S, conductors 4 and 6, contact finger 7, bridged by the controller segment 9, contact finger 10, conductors 14 and 15, controller segment 16, of the controller 17, the actuating coils of the low voltage relay LV and the braking contactor 20 and conductor 18 to the energized conductor 12. Operation of the braking contactor 20 effects the shunting of the braking resistors 119, 120, 121 by the circuit extending through the conductors 66, 67 and 68, the contact members of the braking contact 20 and conductors 116, 117 and 118.

Operation of the low voltage relay LV shunts the contact fingers 7 and 10 of the calender motor controller CMC. This shunt circuit extends from the conductor 4 through the contact members 19 of the low voltage relay LV to the conductor 15.

A further circuit is established for the actuating coil of the control relay 31, this circuit extending from the energized contact finger 7 to the contact finger 24, bridged by the controller segment 9, conductor 25, the actuating coil of the control relay 31, stop push-button switch 26, conductor 27, and the back contact members 28 of the high frequency contactor 8 to the conductor 12. The control relay 31 establishes its own holding circuit through the conductor 29 and through the contact members 30.

Movement of the controller CMC to the first operative position establishes a circuit from the energized conductor 14, through contact fingers 10 and 47, bridged by the controller segment 9, conductor 48, upper contact members 49 of the control relay 31, conductor 50, the actuating coil of the low frequency line contactor 5, conductor 51, and contact members 28 of the high frequency contactor 8 to the energized conductor 12. Operation of low frequency line contactor 5 energizes the stator 58 of the calender motor CM through the conductors 55, 56 and 57.

During the threading operation it is, of course, desirable that the resistance of the secondary circuit 59 and associated circuits be low to secure the proper torque and speed of the calender motor when supplied with the low frequency, and usually low-voltage, alternating current. To accomplish this result the control relay 53 is provided. This relay is disposed to be energized when the control relay 31 is energized. When control relay 31 is energized, the contact members 49 are closed and an energizing circuit is established for the actuating coil of the control relay 53 which circuit may be traced from the energized conductor 50 through conductor 52, the actuating coil of the relay 53, conductors 54 and 27, and contact members 28 of the high frequency contactor 8 to the energized conductor 12. With the operation of the control relay 53 the contact members 72 and 74' are closed, thereby connecting the conductors 66, 67 and 68 to the common junction point 73, when the connection through the contact members of the braking contactor 20 and the conductors 69, 70 and 71 is complete. It is, therefore, obvious that all of the resistor sections in the secondary circuit 59 of the calender motor CM except sections 63, 64 and 65 are shunted, and, in consequence, the calender motor will have the desired torque and speed during the threading operation for the paper machine.

The calender motor CM may thus operate at a slow speed and, since the frequency generator FG begins to rotate the reel motor RM will also begin to rotate at a slow speed having a definite relation to the slow speed of the calender motor CM. The attendant, having raised the various weights about the paper machine will slowly thread the paper through the calender, over the spring actuated idler roller 250, feed it to the respective rollers of the winder and attach the paper to the core 251.

To adjust for the proper tension of the paper after the threading has been completed and before the paper machine is accelerated to the normal operating speed, the stop push-button 26 is actuated and the inching controller IC (see Fig. 3) is moved to the left, thereby establishing a circuit from the energized conductor 13 through conductor 127, contact fingers 128 and 129, bridged by the controller segment 130, conductor 131, actuating coil 132 of the inching motor contactor 21 to the energized conductor 12. The inching motor IM is thus energized through conductors 133, 134 and 135. Since the inching motor is directly under the control of the inching controller IC and is utilized for but short intervals of time while under the observation of the attendant, it is not necessary that this motor be energized from the slow speed low-frequency source of supply indicated by the conductors 1, 2 and 3.

The inching motor will thus rotate at some predetermined speed, driving the frequency changer FC through the belt 201 opposite cone pulleys 202, belt 203 opposite cone pulleys 204, and the reduction gear RG.

If, during normal operation, the tension is not what is desired, as would be apparent from an inspection of the index and scale usually associated with idler roller 250 or an inspection of the paper itself, operation of the belt shifting motor BSM may be effected to provide the requisite gear reduction between the pilot motor and the frequency changer, i. e., the required tension in the paper. Fig. 3 shows the arrangement of the belt shifting motor and the controller therefor.

Movement of the controller segments 153 and 156 in the "RAISE" direction means that the tension in the paper is increased, whereas movement of the controller segments 153 and 156 in the "LOWER" direction means that the tension in the paper is decreased. If the controller segments first mentioned are moved in the one or the other direction, the belt shifting motor BSM, being a split-series motor, is energized from the battery B through the conductor 144, the armature of the belt-shifting motor, one or the other of the series fields 155 or 157 and one or the other of the controller segments 153 or 156 to the other terminal of the battery.

It should be noted that if the inching controller IC be moved to the left, bridging the contact fingers 128 and 129, as just specified, the time-limit relay 300 will be energized. The energizing circuits for the magnetizing and neutralizing coils, respectively, of the time limit relay 300 may be traced from the energized conductor 137, through conductor 138, magnetizing coil 140, neutralizing coil 139, resistors 142 and 141 and conductor 143 to the energized conductor 144. The time-limit relay 300 is of the inductive time-limit type well known in the art. The operation of the inductive time-limit relay causes the opening of the contact member 146 thereby interrupting the circuit for the coil 147 for the magnetic clutch MC. The pilot motor PM is therefore disconnected from the frequency changer FC.

When the belt-shifting motor BSM has been operated to the desired position and the reel motor RM through the operation of the inching motor and the frequency changer, has subjected the paper to the desired tension, the inching controller is moved to the position shown in Fig. 3, whereupon the magnetizing coil 140 is shunted by the circuit through conductor 148, contact fingers 150 and 151 bridged by the controller segment 149 and conductor 152. When the magnetizing coil 140 is thus deenergized, the neutralizing coil 139 which acts in opposition to the magnetizing coil and provides for a complete deenergization of the time-limit relay, will permit the armature of the time-limit relay to move to the position indicated in Fig. 3 to close the contact 150 members 146. The reason for utilizing the time-limit relay 300 is to prevent energization of the clutch actuating coil 147 immediately after the inching contactor 21 is opened, thereby preventing the inching motor from being pulled out of synchronism with the frequency generator by reason of the inertia of the armature and associated parts of the inching motor, which would otherwise still be rotating when the magnetic clutch MC is caused to move to operative position.

After the inching motor has stopped and the time for operation of the time-limit relay 300 has expired, the pilot motor continues to operate the frequency changer FC. From the circuit arrangement shown in Fig. 1 and the explanations of the operation of the pilot motor and frequency changer heretofore given, it is obvious that the reel motor RM will operate at some predetermined speed with reference to the speed of the calender motor. As the speed of the calender motor is changed, as will be pointed out more in detail hereinafter, the frequency of the frequency generator changes and the frequency of the current supplied to the reel motor changes proportionally, thereby assuring that the speed ratio between the reel motor and the calender motor for any given position of the variable speed drive remains constant, that is, the tension in the material as it passes from the calender to the winder reel remains substantially constant for all speeds of the calender motor from the slow-threading speed to the full normal operating speed.

As heretofore pointed out, movement of the controller CMC to the first operative position, *a*, effects the operation of the calender motor from the low frequency source of supply 1, 2 and 3. If, after or during the threading operation it is desired to stop the paper machine, stop-push button 26 is actuated. In again starting the paper machine, it is not necessary to move the controller CMC to the off position but the start-push button 26' need only be actuated and the slow speed operation is resumed without the necessity of operating any other switch.

Movement of the controller CMC to the second operating position, *b*, bridges the contact fingers 10 and 77, and a circuit is thereby established from the energized controller segment 9, through the contact finger 77, conductor 78, the actuating coil of the high speed contactor 8, and the back contact member 78' of the low speed line contactor 5 to the energized conductor 12. Operation of the line contactor 8 connects the primary winding 58 of the calender motor CM to the high frequency source of supply 11, 12 and 13 through the conductors 79, 80 and 81. With the operation of the controller CMC to the second operative position *b*, the energizing circuit for the low-speed line contactor 5 is deenergized by the interruption of the circuit of the contactor finger 47. There is therefore no danger of having the primary or stator winding 58 connected to the low-frequency and high-frequency source of supply at the same time.

As the controller CMC is moved to the third operative position, *c*, the contact fingers 92 and 94 are bridged, thereby shunting out the resistor sections 193 and 195 through conductors 93 and 95. Movement of the controller to the fourth operating position, *d*, includes the contact finger 90 along with the contact fingers 92 and 94 as being bridged by the controller segment 89, whereby the resistor section 191 is shunted out by the conductor 91 and the controller segment 89.

Resistor sections 184, 186 and 188 may be similarly shunted out by conductors 84, 86 and 88 upon the successive bridging of the contact fingers 85 and 87, and, 85, 87 and 83 by the controller segment 82. After all the resistor sections just mentioned have been shunted, further increase of speed is effected by the use of "balanced speed points". The operation of the controller CMC to the seventh operative position, *g*, energizes the contact finger 96 from the energized controller segment 9, thereby establishing an energizing circuit for the actuating coil 98 of the accelerating relay 100 through the conductors 97 and 99.

The operation of the accelerating relay 100 connects the conductors 101, 102 and 103 to a common point thus shunting out the additional resistor sections 104, 105 and 106. For the eighth controller position, *h*, the contact finger 107 is energized from segment 9 through the conductor 108, actuating coil 109 and conductors 111 and 99, and the accelerating relay 110 is caused to operate to connect the conductors 116, 117 and 118 and 69, 70 and 71 to a common point 112 thereby shunting the additional resistor sections 113, 114, and 115. Since the resistor sections 119, 120 and 121 are already shunted, the only resistor sections remaining in the circuit of the rotor winding 59 are the sections 63, 64 and 65. The calender motor is therefore brought up to full operating speed and through the operation of the frequency generator, the frequency changer, the variable speed drive and the pilot motor, the reel motor is caused to change its speed proportionally to the various speed changes that take place during the accelerating period of the calender motor.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a roll winding system, in combination, a supply reel for material, a plurality of rollers disposed to carry a core therebetween in tangential relation therewith, upon which core material may be wound from the supply reel, a calender having calender rollers disposed intermediate the supply reel and said plurality of rollers, said material traversing the calender rollers in passing from the supply reel to the core, and means for maintaining a substantially proportional speed difference between the calender rollers and said plurality of rollers.

2. In a roll winding system, in combination, a calender having a plurality of rollers, a winder reel including a core, a pair of rollers disposed to carry the core therebetween in tangential relation therewith, upon which core material may be wound in passing from the calender, means for maintaining a substantially proportional speed difference between the calender rollers and the winder reel for all speeds of the calender rollers, and means for predetermining the relative speeds of the calender and winder reel.

3. In a roll winding system, in combination, a calender having a plurality of rollers, a calender motor for driving the rollers, a winder reel comprising a core and winding rollers for driving the core, a winder motor for driving the winding rollers, means for varying the speed of the calender motor, means for proportionally varying the speed of the winder motor, and means for maintaining a predetermined speed ratio between the two motors for the entire speed range of the motors.

4. A control system for machines operating on paper or similar material, a supply reel, means for controlling the rotation of the reel, a calender for receiving the material from the reel, a motor for driving the calender, a winder for winding the material, said winder including a winder core, operating rollers and a motor for driving said core and operating rollers, a generator mechanically coupled to the calender motor to operate at the same speed as the calender motor, a source of electrical energy for energizing said calender motor and winder motor, means for energizing said winder motor from said generator to control the speed of said winder motor with reference to said calender motor to provide a constant tension in the material.

5. In a system of control for controlling the relative speeds of two motors, in combination, a main motor, a generator coupled to the motor, a second motor, a pilot motor, means for changing the characteristics of an electric current, a source of electrical energy, means for interconnecting the mentioned electrical machines and the source of energy, said means through its action being adapted to vary the speed of the second motor with reference to the speed of the main motor, and means for adjusting the control effect of the means.

6. In a system of control for a pair of motors driving different parts of a composite machine, comprising a main alternating current motor, a second alternating current motor, a source of alternating current of constant frequency for driving the main motor, control means for varying the speed of the main motor over a wide speed range, a frequency changer, a pilot motor for driving the speed changer, means for selecting and maintaining any speed ratio between the pilot motor and the frequency changer driven thereby, a frequency generator mechanically coupled to the main motor, means for energizing the pilot motor and the frequency changer from the frequency generator and means adapted to energize the second motor from the frequency changer and the source of alternating current of constant frequency whereby the speed ratio between the main motor and the second motor is maintained constant for all changes of speed of the main motor.

7. In a control system for a pair of alternating current motors, comprising a pair of motors, a source of alternating current of substantially constant frequency for effecting the operation of one of said motors and for energizing the other of said motors, a frequency generator mechanically coupled to the motor connected for operation to the source of energy and electrically connected to the other motor, frequency changing means connected to the frequency generator and the other motor for controlling the speed ratio between the motors.

8. In a control system for a pair of alternating current motors driving different parts of a composite machine, comprising a main motor, a second motor, a source of alternating current of substantially constant frequency for effecting the operation of the main motor and for partially energizing the second motor, means for varying the speed of the main motor over a wide range, a frequency changer, a frequency generator mechanically coupled to the main motor and electrically connected to the second motor through the speed changer whereby the speed ratio between the two motors may be maintained constant for all speed adjustments of the main motor, and means controlling the operation of the speed changer for selecting any desired speed ratio.

9. A control system for the individual motors of a paper machine, comprising a calender, a winder, a calender motor for driving the same, a source of alternating current having substantially constant frequency for effecting operation of the calender motor, a frequency generator, having stator and rotor windings, coupled to the calender motor, a pilot motor having stator and rotor windings, a frequency changer having stator and rotor windings, a winder motor having stator and rotor windings, circuit connections for connecting the stators of said winder motor, pilot motor and frequency generator to the constant frequency source of energy, circuit connections for connecting the rotors of the pilot motor and frequency generator and the stator of the frequency changer in closed circuit relation, circuit connections for connecting the rotors of the winder motor and frequency changer in closed circuit relation whereby the speed ratio between the calender motor and winder motor is maintained constant.

10. A control system for the individual motors of a paper machine, comprising a calender, a calender motor for driving the same, a source of alternating current having substantially constant frequency for effecting the operation of the calender motor, a frequency generator, having stator and rotor windings, mechanically coupled to the calender motor to operate in synchronism with the calender motor, a frequency changer having stator and rotor windings, a pilot motor having stator and rotor windings, a mechanical speed changer, means for adjusting the speed ratio of the speed changer, said speed changer, being disposed intermediate the pilot motor and the frequency changer whereby the frequency changer may be driven by the pilot motor at any selected speeds over a given range, a winder motor having stator and rotor windings, circuit connections for connecting the rotors of said winder motor, pilot motor and frequency generator to the source of energy, circuit connections for connecting the rotors of the pilot motor and frequency generator and stator of the speed changer in closed circuit relation, and circuit connections for connecting the rotors of the winder motor and frequency changer in closed circuit relation, whereby the speed ratio between the calender motor and winder motor, for any setting of the mechanical speed changer, may be maintained constant regardless of changers of speed of the calender motor.

11. In a control system for a pair of alternating current motors, comprising a main alternating current motor, a second alternating current motor, a frequency generator driven by the main motor, means interconnecting the frequency generator and the second motor, a source of alternating current energy, means for connecting said source to said motors, and means associated with the interconnecting means between the frequency generator and the second motor for changing the frequency of the current supplied to the second motor whereby the speed ratio between the main motor and second motor is held constant.

12. A control system comprising, in combination, means for delivering material, revoluble means for receiving said material, a generator having an input winding, means for driving the delivering means and the said generator, the frequency output of said generator being responsive to the speed of the driving means, a motor having a winding for driving the revoluble means, said winding being connected in closed circuit relation with said output winding of said generator so that the speed of said motor varies to provide a substantially uniform tension in the material for all speeds of the delivering means as it is being received by the said revoluble means.

13. A control system for machines operating on paper or similar material, a supply reel, means for controlling the rotation of the reel, a calender for receiving the material from the reel, a motor for driving the calender, a winder for winding the material, said winder including a winder core, operating rollers and a motor for driving said core and operating rollers, a generator mechanically coupled to the calender motor to operate at the same speed as the calender motor, a source of electrical energy for energizing said calender motor and winder motor, means for energizing said winder motor from said generator, modifying means for modifying the electrical characteristics of said energizing means, whereby a predetermined speed relation is maintained between the calender motor and the winder motor.

14. In a system of control for controlling the relative speeds of two motors, in combination, a main motor, a generator coupled to the motor, a second motor, a pilot motor, means for changing the characteristics of an electric current, a source of electrical energy, and means for interconnecting the mentioned electrical machines and the source of energy, said interconnecting means and first-named means being disposed to vary the speed of the second motor with reference to the speed of the main motor.

15. In a roll winding system for winding material, in combination, a material-supply roller, a pair of dynamo-electric machines, a generator, switching means for selectively connecting said dynamo-electric machines to said generator, whereby to drive the roller or else to restrain the operation of the roller to provide a certain tension in the material as it is drawn from the roller, a calender, a motor for driving the calender, a source of energy and control means for interconnecting the motor with the source of energy and for varying the speed of the motor over a wide range, a generator driven by the motor, a winder motor and a winder for drawing the material from the calender to wind the same and means for connecting the winder motor to the source of energy and said last named generator whereby the speed of the winder motor may be adjusted to have a definite relation to the speed of the calender motor.

16. In a roll winding system for winding material, in combination, material delivering means, material receiving means, alternating current motors for driving said means, sources of alternating current for the motors, and tension control means operatively associated with said material delivering means and material receiving means and responsive to the relative characteristics of the alternating current supplied to the motors to maintain a proportional speed difference between said means.

17. In a roll winding system for winding material, in combination, material delivering means, material receiving means, material-tension control means operatively associated with said material delivering and material receiving means to maintain a proportional speed difference between said means and means for adjusting the effect of said material-tension adjusting means.

18. In an electrical system of control for controlling the transmission of relative angular motion of a generator and a motor, comprising, an alternating current generator constituting a transmitting device, an alternating current motor constituting a receiving device, connections between said devices whereby said receiving device is responsive to the movements of said transmitting device, said connections including inductively related windings electrically connected to said generator and said motor respectively, and means for continuously relatively displacing said windings as a function of the speed of said generator thereby maintaining a definite speed relation between said generator and said motor.

19. In an electrical system of control for controlling the speed relation between a motor and a generator, comprising, a generator, a motor, connections between said generator and motor whereby the speed of the motor is made responsive to the speed of the generator, said connections including a device disposed to operate at a speed having a definite relation to the speed of the generator for changing the characteristics of the current flowing from the generator to the motor, means for selectively changing the effect of said device whereby any selected speed difference may be maintained between said generator and said motor.

20. In an electrical system of control for controlling the speed relation between a motor and a generator, comprising, a generator, a motor, and connections between said generator and motor whereby the speed of the motor is made responsive to the speed of the generator, said connections including a device disposed to operate at a speed having a definite relation to the speed of the generator for changing the characteristics of the current flowing from the generator to the motor whereby a definite speed difference may be maintained between said motor and said generator.

CHESTER W. DRAKE.